(12) United States Patent
Hasegawa et al.

(10) Patent No.: US 10,700,338 B2
(45) Date of Patent: Jun. 30, 2020

(54) ALL-SOLID-STATE BATTERY WITH LAYERED CURRENT SHUNT PART

(71) Applicant: TOYOTA JIDOSHA KABUSHIKI KAISHA, Toyota-shi, Aichi-ken (JP)

(72) Inventors: Hajime Hasegawa, Susono (JP); Yuki Matsushita, Atsugi (JP); Mitsuru Tateishi, Susono (JP); Hideyo Ebisuzaki, Toyota (JP); Hideaki Nishimura, Sunto-gun (JP); Yusuke Okuhata, Susono (JP); Shigenori Hama, Sunto-gun (JP); Norihiro Ose, Sunto-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/924,487

(22) Filed: Mar. 19, 2018

(65) Prior Publication Data

US 2018/0294468 A1  Oct. 11, 2018

(30) Foreign Application Priority Data

Apr. 5, 2017  (JP) .................................. 2017-075201

(51) Int. Cl.
*H01M 2/34* (2006.01)
*H01M 10/0585* (2010.01)
(Continued)

(52) U.S. Cl.
CPC ............. *H01M 2/34* (2013.01); *H01M 2/345* (2013.01); *H01M 4/662* (2013.01);
(Continued)

(58) Field of Classification Search
None
See application file for complete search history.

(56) References Cited

U.S. PATENT DOCUMENTS

| | | |
|---|---|---|
| 4,188,460 A | 2/1980 | Kang et al. |
| 7,604,895 B2 | 10/2009 | Kim et al. |

(Continued)

FOREIGN PATENT DOCUMENTS

| | | |
|---|---|---|
| JP | 11-097066 A | 4/1999 |
| JP | 2001-68156 A | 3/2001 |

(Continued)

OTHER PUBLICATIONS

Japanese Patent Application No. 2017-076986, corresponding U.S. Appl. No. 15/941,116.

(Continued)

*Primary Examiner* — Lucas J. O'Donnell
(74) *Attorney, Agent, or Firm* — Sughrue Mion, PLLC

(57) ABSTRACT

Disclosed is an all-solid-state battery that makes it possible for a larger rounding current flow into a short-circuit current shunt part than to each electric element when the short-circuit current shunt part and the electric elements short-circuit in nail penetration testing. The all-solid-state battery includes at least one short-circuit current shunt part and a plurality of electric elements, the short-circuit current shunt part and the electric elements being stacked, wherein the short-circuit current shunt part includes a first current collector layer, a second current collector layer, and an insulating layer provided between the first and second current collector layers, all of the layers being stacked, each of the electric elements includes a cathode current collector layer, a cathode material layer, a solid electrolyte layer, an anode material layer, and an anode current collector layer, all of the layers being stacked, the electric elements are electrically connected to each other in parallel, the first current collector layer is electrically connected with the cathode current collector layer, the second current collector layer is electrically connected with the anode current collector layer, and (Continued)

contact resistance between the first and second current collector layers when pressure at 100 MPa is applied is lower than that between the cathode and anode current collector layers when pressure at 100 MPa is applied.

4 Claims, 6 Drawing Sheets

(51) Int. Cl.
    *H01M 4/66* (2006.01)
    *H01M 10/0562* (2010.01)
    *H01M 10/052* (2010.01)

(52) U.S. Cl.
    CPC ..... *H01M 10/052* (2013.01); *H01M 10/0562* (2013.01); *H01M 10/0585* (2013.01); *H01M 4/661* (2013.01); *H01M 2200/20* (2013.01); *H01M 2300/0068* (2013.01)

(56) References Cited

U.S. PATENT DOCUMENTS

| | | | |
|---|---|---|---|
| 10,103,376 B2* | 10/2018 | Sugiura | H01M 2/266 |
| 2005/0266292 A1 | 12/2005 | Kim et al. | |
| 2010/0021821 A1 | 1/2010 | Kim et al. | |
| 2010/0159315 A1 | 6/2010 | Imasaka et al. | |
| 2012/0114981 A1 | 5/2012 | Cho et al. | |
| 2014/0363746 A1* | 12/2014 | He | H01M 10/052 429/406 |
| 2015/0188195 A1* | 7/2015 | Matsushita | H01M 10/0585 429/152 |
| 2015/0357622 A1 | 12/2015 | Mune et al. | |
| 2015/0364743 A1* | 12/2015 | Shen | H01M 10/0413 429/61 |
| 2016/0006013 A1 | 1/2016 | Shen et al. | |
| 2018/0198132 A1* | 7/2018 | Liang | H01M 4/668 |

FOREIGN PATENT DOCUMENTS

| | | |
|---|---|---|
| JP | 2001-68157 A | 3/2001 |
| JP | 2001-297795 A | 10/2001 |
| JP | 2003-142068 A | 5/2003 |
| JP | 2004-311073 A | 11/2004 |
| JP | 2009-087600 A | 4/2009 |
| JP | 4554676 B2 | 9/2010 |
| JP | 2015-18710 A | 1/2015 |
| JP | 2015-156323 A | 8/2015 |
| JP | 2016-506043 A | 2/2016 |
| JP | 6027262 B2 | 11/2016 |
| JP | 2018181527 A | 11/2018 |

OTHER PUBLICATIONS

Japanese Patent Application No. 2017-075196, corresponding U.S. Appl. No. 15/936,970.

Notice of Allowance dated Jul. 20, 2018, which issued during the prosecution of U.S. Appl. No. 15/298,838.

Office Action dated Apr. 30, 2018 issued in U.S. Appl. No. 15/298,838.

* cited by examiner

ALL-SOLID-STATE BATTERY WITH LAYERED CURRENT SHUNT PART

FIELD

The present application relates to stacked all-solid-state batteries.

BACKGROUND

Nail penetration testing is known as testing for evaluating safety when a battery is broken from the outside. Nail penetration testing is testing of penetrating a conductive nail through a battery, and observing temperature rising etc. when internal short circuits occur in its electric elements.

Patent Literature 1 discloses an electrolyte solution based battery comprising a plurality of power generation elements that are electrically connected in series via bipolar electrodes, and external short circuit members that are provided outside the power generation elements, wherein the electric resistance of current collectors of a power generation element is lower than that of conductive materials of an external short-circuit member. Patent Literature 1 describes that in nail penetration testing, the power from the power generation elements is consumed by short circuits of the external short-circuit members, which can lead to suppression of heat generation due to internal short circuits in the power generation elements. Patent Literatures 2 to 4 also disclose various techniques for suppressing heat generation caused by internal short circuits of a battery.

CITATION LIST

Patent Literature

Patent Literature 1: JP 2015-156323 A
Patent Literature 2: JP H11-097066 A
Patent Literature 3: JP 2009-087600 A
Patent Literature 4: JP 6027262 B2

SUMMARY

Technical Problem

The inventors of the present application faced a problem that when nail penetration testing short-circuits electric elements in an all-solid-state battery formed by electrically connecting a plurality of stacked electric elements in parallel, electrons flow from some electric elements into the other electric elements (which may be referred to as "rounding current" hereinafter), which results in local rising in temperature of some electric elements, to deteriorate battery materials. For example, when a nail is penetrated through a plurality of electric elements, the electric elements having low shunt resistance and those having high shunt resistance (including those not short-circuiting) coexist, to concentrate a rounding current in the electric elements having low shunt resistance.

The inventors expected that a short-circuit current shunt part (a part that causes a short-circuit current to divide, to flow thereinto when the electric elements and the short-circuit current shunt part short-circuit) is provided separately from the electric elements, and not only some electric elements but also the short-circuit current shunt part is short-circuited in nail penetration testing, to shunt a rounding current from the electric elements of higher shunt resistance to not only the electric elements of lower shunt resistance but also the short-circuit current shunt part of low shunt resistance, which can prevent the temperature of some electric elements from locally rising. Specifically, the inventors expected that using current collectors having lower electric resistance than those of the electric elements as current collectors of the short-circuit current shunt part made it possible to pass a larger rounding current to the short-circuit current shunt part than to the electric elements when the short-circuit current shunt part and electric elements short-circuited, which was able to lead to further suppressed local temperature rising inside the battery.

However, the inventors encountered a new problem that even if current collectors having lower electric resistance than those of the electric elements were used as current collectors of the short-circuit current shunt part, there was a case where a larger rounding current was not able to flow to the short-circuit current shunt part than to the electric elements when the short-circuit current shunt part and electric elements short-circuited in nail penetration testing.

Solution to Problem

The inventors of the present application had intensively researched into reasons for the above problems and means for solving these problems, and as a result found the followings:

(1) the lower "contact resistance" between a first current collector layer (cathode current collector layer) and a second current collector layer (anode current collector layer), which are provided for the short-circuit current shunt part or an electric element is, the lower "shunt resistance" of the short-circuit current shunt part or the electric element is. That is, it is important for making the shunt resistance of the short-circuit current shunt part lower than that of the electric element to employ combination of current collector layers, the contact resistance between which is low, in the short-circuit current shunt part;

(2) a small value of the electric resistance of the current collector layers itself does not always lead to a small value of the contact resistance between the current collector layers each other as well;

(3) In nail penetration testing on the all-solid-state battery, pressure as high as 100 MPa is applied to the short-circuit current shunt part and the electric elements. Such high pressure is unique to nail penetration testing on all-solid-state batteries, and cannot be produced in nail penetration testing on electrolyte solution based batteries;

(4) combination of current collector layers, the contact resistance between which takes a small value under low pressure, is not always combination of current collector layers, the contact resistance between which takes a small value under high pressure, as well; and (5) In view of the above (1) to (4), in nail penetration testing of the all-solid-state battery, it is effective for making the shunt resistance of the short-circuit current shunt part lower than that of each electric element to employ combination of current collector layers, the contact resistance between which takes a small value under pressure as high as 100 MPa, as combination of the first and second current collector layers of the short-circuit current shunt part, and to employ combination of current collector layers, the contact resistance between which takes a large value under pressure as high as 100 MPa, as combination of the cathode and anode current collector layers of each electric element.

In view of the above described findings, the present application discloses an all-solid-state battery comprising at least one short-circuit current shunt part and a plurality of electric elements, the short-circuit current shunt part and the electric elements being stacked, wherein the short-circuit current shunt part comprises a first current collector layer, a second current collector layer, and an insulating layer provided between the first and second current collector layers, all of the layers being stacked, each of the electric elements comprises a cathode current collector layer, a cathode material layer, a solid electrolyte layer, an anode material layer, and an anode current collector layer, all of the layers being stacked, the electric elements are electrically connected to each other in parallel, the first current collector layer is electrically connected with the cathode current collector layer, the second current collector layer is electrically connected with the anode current collector layer, and contact resistance between the first and second current collector layers when pressure at 100 MPa is applied is lower than that between the cathode and anode current collector layers when pressure at 100 MPa is applied, as one means for solving the above problems.

"Contact resistance . . . when pressure at 100 MPa is applied" is resistance between current collector layers when the current collector layers are pressed to each other at 100 MPa in pressure.

In the all-solid-state battery of the present disclosure, preferably, the first current collector layer is formed of aluminum, the second current collector layer is formed of copper, the cathode current collector layer is formed of stainless steel, and the anode current collector layer is formed of copper. The expression " . . . formed of" allows unavoidable impurities to be contained.

In the all-solid-state battery of the present disclosure, preferably, the directions as follows are the same: a direction of stacking the cathode current collector layer, the cathode material layer, the solid electrolyte layer, the anode material layer, and the anode current collector layer in each of the electric elements; a direction of stacking the electric elements; a direction of stacking the first current collector layer, the insulating layer, and the second current collector layer in the short-circuit current shunt part; and a direction of stacking the short-circuit current shunt part and the electric elements.

In the all-solid-state battery of the present disclosure, preferably, the short-circuit current shunt part is provided at least outside the electric elements.

Advantageous Effects of Invention

In the all-solid-state battery of the present disclosure, combination of current collector layers, the contact resistance between which takes a small value under pressure as high as 100 MPa, is employed as combination of the first and second current collector layers that compose the short-circuit current shunt part, and combination of current collector layers, the contact resistance between which takes a large value under pressure as high as 100 MPa, is employed as combination of the cathode and anode current collector layers that compose an electric element. Thereby, the shunt resistance of the short-circuit current shunt part is lower than that of each electric element when the short-circuit current shunt part and the electric elements short-circuit in nail penetration testing, which makes it possible for a larger rounding current to flow into the short-circuit current shunt part than to each electric element.

DETAILED DESCRIPTION OF EMBODIMENTS

1. All-Solid-State Battery

Figure 1:
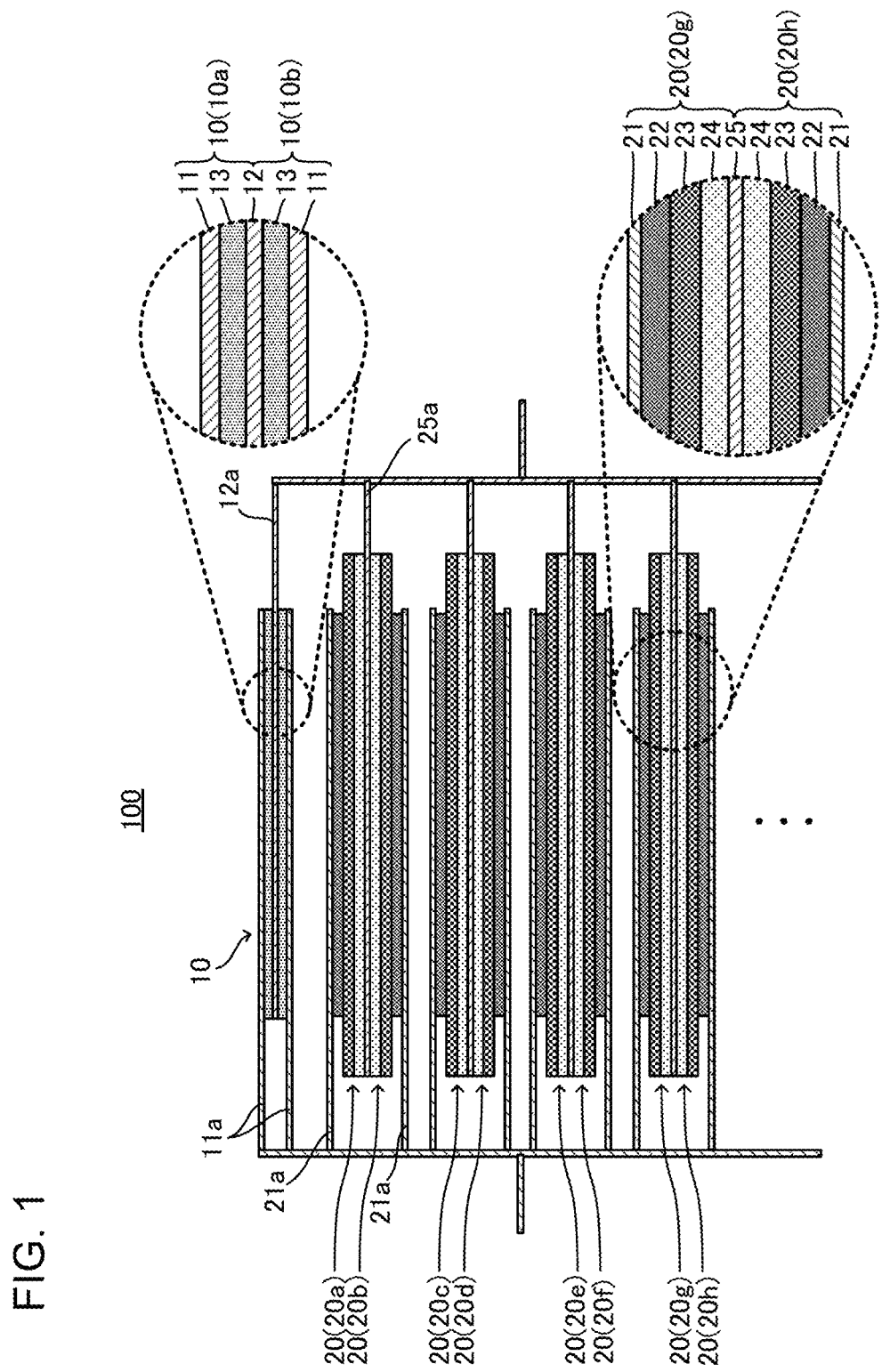
FIG. 1 is an explanatory schematic view of structure of layers of an all-solid-state battery 100.

FIG. 1 schematically shows structure of layers of an all-solid-state battery 100. In FIG. 1, a battery case etc. are omitted for convenient explanation.

As shown in FIG. 1, the all-solid-state battery 100 is an all-solid-state battery that includes short-circuit current shunt part 10 and a plurality of electric elements 20, 20, . . . , which are stacked. The short-circuit current shunt part 10 includes first current collector layers 11, a second current collector layer 12, and insulating layers 13 provided between the first current collector layers 11 and the second current collector layer 12, all of which are stacked. Each of the electric elements 20 includes a cathode current collector layer 21, a cathode material layer 22, a solid electrolyte layer 23, an anode material layer 24, and an anode current collector layer 25, all of which are stacked. In the all-solid-state battery 100, a plurality of the electric elements 20, 20, . . . are electrically connected with each other in parallel, the first current collector layers 11 are electrically connected with the cathode current collector layers 21, and the second current collector layer 12 is electrically connected with the anode current collector layers 25. Here, a feature of the all-solid-state battery 100 is that the contact resistance between the first current collector layers 11 and the second current collector layer 12 when pressure at 100 MPa is applied is lower than that between the cathode current collector layers 21 and the anode current collector layers 25 when pressure at 100 MPa is applied.

1.1. Short-Circuit Current Shunt Part 10

The short-circuit current shunt part 10 includes the first current collector layers 11, the second current collector layer 12, and the insulating layers 13 provided between the first current collector layers 11 and the second current collector layer 12. In the short-circuit current shunt part 10 having such structure, while the first current collector layers 11 are properly insulated from the second current collector layer 12 via the insulating layers 13 when the battery is normally used, the first current collector layers 11 and the second current collector layer 12 touch in short-circuiting due to nail penetration, which leads to low electric resistance.

1.1.1. First Current Collector Layers 11 and Second Current Collector Layer 12

The first current collector layers 11 and the second current collector layer 12 may be formed of metal foil, metal mesh, etc., and are especially preferably formed of metal foil. Metals that may form the current collector layers 11 and 12 include Cu, Ni, Al, Fe, Ti, Zn, Co, Cr, Au, Pt, and stainless steel. Among them, combination that makes the contact resistance when pressure at 100 MPa is applied low is selected to be used. Combination that makes the contact resistance when pressure at 100 MPa is applied low can be grasped in advance by experiments etc. For example, if the first current collector layers 11 are formed of aluminum (Al), employing a layer formed of copper (Cu) as the second current collector layer 12 leads to much lower contact resistance between the first current collector layers 11 and the second current collector layer 12 when pressure at 100 MPa is applied. The current collector layers 11 and 12 may have some coating layers for adjusting the contact resistance over their surfaces, which are, for example, formed of carbon.

The first current collector layers 11 and the second current collector layer 12 are not limited in terms of thickness, but for example, are preferably 0.1 µm to 1 mm, and are more preferably 1 µm to 100 µm in thickness. If being within this range in thickness, the current collector layers 11 and 12 can be more properly touched to each other in nail penetration testing, which can lead to much lower shunt resistance of the short-circuit current shunt part 10.

As shown in FIG. 1, the first current collector layers 11 are preferably connected to the cathode current collector layers 21 of the electric elements 20 electrically via tabs 11a; and the second current collector layer 12 is preferably connected to the anode current collector layers 25 of the electric elements 20 electrically via a tab 12a. The tabs 11a may be formed of either the same material as, or a different material from the first current collector layers 11. The tab 12a may be formed of either the same material as, or a different material from the second current collector layer 12. In view of passing a larger rounding current to the short-circuit current shunt part 10 in nail penetration testing, the electric resistance of the tabs 11a and 12a itself is preferably lower than that of a cathode tab 21a and an anode tab 25a, which will be described later.

1.1.2. Insulating Layers 13

In the all-solid-state battery 100, the insulating layers 13 have only to insulate the first current collector layers 11 from the second current collector layer 12 when the battery is normally used. The insulating layers 13 may be insulating layers formed of organic materials, inorganic materials, or organic materials and inorganic materials coexisting therein. Specifically, the insulating layers 13 are preferably formed of materials that satisfy the following three points: (1) not to short-circuit by cracking etc. when the all-solid-state battery is constrained; (2) to continue to short-circuit stably when a nail is penetrated; and (3) to have high thermal stability.

Organic materials that can form the insulating layers 13 include various resins such as various thermoplastic resins and various thermosetting resins. Specifically, thermosetting resins such as polyimide are preferable. Generally, thermosetting resins are harder and brittler, and further have higher thermal stability than thermoplastic resins. That is, when being formed of a thermosetting resin, the insulating layers 13 easily break when a nail is penetrated through the short-circuit current shunt part 10, which makes it possible to suppress the insulating layers 13 from following deformation of the first current collector layers 11 and the second current collector layer 12, to more easily touch the first current collector layers 11 to the second current collector layer 12.

Inorganic materials that can form the insulating layers 13 include various ceramics such as inorganic oxides. The insulating layers 13 may be formed of metal foil that has oxide coating over its surface. For example, aluminum foil that has aluminum oxide coating over its surface is obtained by anodizing the aluminum foil to form anodic oxide coating over the surface of the aluminum foil. In this case, the thickness of the oxide coating is preferably 0.01 µm to 5 µm. The lower limit thereof is more preferably no less than 0.1 µm, and the upper limit thereof is more preferably no more than 1 µm.

The thickness of each insulating layer 13 is not specifically limited, but for example, is preferably 0.1 µm to 1 mm, and is more preferably 1 µm to 100 µm. The thickness of each insulating layer 13 within this range makes it possible to more properly insulate the first current collector layers 11 from the second current collector layer 12 when the battery is normally used, and can lead to more proper continuity between the first current collector layers 11 and the second current collector layer 12 according to deformation due to external stress such as nail penetration, to cause internal short circuits.

1.2. Electric Elements 20

Each electric element 20 is formed by stacking the cathode current collector layer 21, the cathode material layer 22, the solid electrolyte layer 23, the anode material layer 24, and the anode current collector layer 25. That is, the electric element 20 can function as a single cell.

1.2.1. Cathode Current Collector Layer 21

The cathode current collector layer 21 may be formed of metal foil, metal mesh, etc., and is especially preferably formed of metal foil. Metals that may form the cathode current collector layer 21 include Ni, Cr, Au, Pt, Al, Fe, Ti, Zn, and stainless steel. Among them, combination that makes the contact resistance with the anode current collector layer 25, which is described later, when pressure at 100 MPa is applied high is selected to be used. For example, if the cathode current collector layer 21 is formed of aluminum (Al), employing a layer formed of stainless steel (SUS) as the anode current collector layer 25 leads to much higher contact resistance between the cathode current collector layer 21 and the anode current collector layer 25 when pressure at 100 MPa is applied. The cathode current collector layer 21 may have some coating layer for adjusting the contact resistance over its surface, which is, for example, carbon coating. The thickness of the cathode current collector layer 21 is not limited, but for example, is preferably 0.1 µm to 1 mm, and is more preferably 1 µm to 100 µm. The cathode current collector layer 21 preferably includes a tab 21a at its end part. The tab 21a makes it possible to electrically connect the first current collector layers 11 and the cathode current collector layer 21 easily, and to electrically connect the cathode current collector layers 21 to each other easily in parallel.

1.2.2. Cathode Material Layer 22

The cathode material layer 22 contains at least active material, and further contains a solid electrolyte, a binder, and a conductive additive optionally. Known active materials may be used as the active material. One may select two materials different in electric potential at which predetermined ions are stored and released (charge and discharge potential) among known active materials, to use a material displaying noble potential as cathode active material, and a material displaying base potential as anode active material described later. For example, when a lithium ion battery is configured, various lithium containing composite oxides such as lithium cobaltate, lithium nickelate, $LiNi_{1/3}Co_{1/3}Mn_{1/3}O_2$, lithium manganate, and spinel lithium compounds can be used as the cathode active material. The surface of the cathode active material may be coated with an oxide layer such as a lithium niobate layer, a lithium titanate layer, and a lithium phosphate layer. The solid electrolyte is preferably an inorganic solid electrolyte. This is because ion conductivity of inorganic solid electrolytes is higher compared with organic polymer electrolytes. This is also because inorganic solid electrolytes are superior in heat resistance compared with organic polymer electrolytes. This is moreover because pressure applied to the electric elements 20 in nail penetration testing is higher compared to the case using an organic polymer electrolyte, which makes the effect of the all-solid-state battery 100 of the present disclosure outstanding. Examples of inorganic solid electrolytes include solid electrolytes of oxides such as lithium lanthanum zirconate, and solid electrolytes of sulfides such as $Li_2S$—$P_2S_5$. Especially, a sulfide solid electrolyte containing $Li_2S$—$P_2S_5$ is preferable, and a sulfide solid electrolyte containing no less than 50 mol % of $Li_2S$—$P_2S_5$ is more preferable. As the binder, various binders such as butadiene rubber (BR), acrylate-butadiene rubber (ABR), and polyvinylidene difluoride (PVdF) can be used. Carbon materials such as acetylene black and ketjenblack, and metallic materials such as nickel, aluminum and stainless steel can be used as the conductive additive. The contents of the constituents in the cathode material layer 22 may be the same as in a conventional layer. The shape of the cathode material layer 22 may be the same as a conventional layer as well. Specifically, from the viewpoint that the all-solid-state battery 100 can be easily configured, the cathode material layer 22 is preferably a sheet. In this case, the thickness of the cathode material layer 22 is, for example, preferably 0.1 μm to 1 mm, and more preferably 1 μm to 150 μm.

1.2.3. Solid Electrolyte Layer 23

The solid electrolyte layer 23 contains a solid electrolyte, and optionally a binder. The solid electrolyte is preferably the above described inorganic solid electrolyte. The same binder used for the cathode material layer 22 may be properly selected to be used as the binder. The contents of the constituents in the solid electrolyte layer 23 may be the same as in a conventional layer. The shape of the solid electrolyte layer 23 may be the same as a conventional layer as well. Specifically, from the viewpoint that the all-solid-state battery 100 can be easily configured, the solid electrolyte layer 23 is preferably a sheet. In this case, the thickness of the solid electrolyte layer 23 is, for example, preferably 0.1 μm to 1 mm, and more preferably 1 μm to 100 μm.

1.2.4. Anode Material Layer 24

The anode material layer 24 contains at least active material, and further contains a solid electrolyte, a binder, and a conductive additive optionally. Known active materials may be used as the active material. One may select two materials different in electric potential at which predetermined ions are stored and released (charge and discharge potential) among known active materials, to use a material displaying noble potential as the above described cathode active material, and a material displaying base potential as the anode active material. For example, when a lithium ion battery is configured, carbon materials such as graphite and hard carbon, various oxides such as lithium titanate, Si and Si alloys, or metal lithium and lithium alloys can be used as the anode active material. The same solid electrolyte, binder, and conductive additive used for the cathode material layer 22 can be properly selected to be used. The contents of the constituents in the anode material layer 24 may be the same as in a conventional layer. The shape of the anode material layer 24 may be the same as a conventional layer as well. Specifically, from the viewpoint that the all-solid-state battery 100 can be easily configured, the anode material layer 24 is preferably a sheet. In this case, the thickness of the anode material layer 24 is, for example, preferably 0.1 μm to 1 mm, and more preferably 1 μm to 100 μm. The thickness of the anode material layer 24 is preferably determined so that the capacity of the anode is larger than that of the cathode.

1.2.5. Anode Current Collector Layer 25

The anode current collector layer 25 may be formed of metal foil, metal mesh, etc., and is especially preferably formed of metal foil. Metals that may form the anode current collector layer 25 include Cu, Ni, Fe, Ti, Co, and stainless steel. Among them, combination that makes the contact resistance with the above described cathode current collector layer 21 when pressure at 100 MPa is applied high is selected to be used. The anode current collector layer 25 may have some coating layer for adjusting the contact resistance over its surface, which is, for example, carbon coating. The thickness of the anode current collector layer 25 is not limited, but for example, is preferably 0.1 μm to 1 mm, and is more preferably 1 μm to 100 μm. The anode current collector layer 25 preferably includes a tab 25a at its end part. The tab 25a makes it possible to electrically connect the second current collector layer 12 to the anode current collector layer 25 easily, and to electrically connect the anode current collector layers 25 to each other easily in parallel.

1.3. Arrangement and Connection Manner of Short-circuit Current Shunt Part and Electric Elements

1.3.1. Arrangement of Electric Elements

In the all-solid-state battery 100, the number of stacking the electric elements 20 is not limited, but may be properly determined according to the power of the battery to be aimed. In this case, a plurality of the electric elements 20 may be stacked so as to directly touch to each other, and may be stacked via some layers (for example, insulating layers) or spaces (air spaces). In FIG. 1, a space is provided between electric elements 20b and 20c, between electric elements 20d and 20e, and between electric elements 20f and 20g for convenient explanation. However, a space is not necessary between a plurality of the electric elements 20. In view of improving the power density of the battery, a plurality of the electric elements 20 are preferably stacked so as to directly touch to each other. As shown in FIG. 1, two electric elements 20a and 20b preferably share the anode current collector 25, which improves the power density of the battery more. Further, as shown in FIG. 1, in the all-solid-state battery 100, a direction of stacking a plurality of the electric elements 20 is preferably the same as that of stacking the layers 21 to 25 of each electric element 20, which makes it easy to constrain the all-solid-state battery 100, to improve the power density of the battery more.

1.3.2. Electric Connection of Electric Elements Each Other

In the all-solid-state battery 100, the electric elements are electrically connected to each other in parallel. Among the electric elements connected in parallel as described above, when one electric element short-circuits, electrons concentratedly flow into the one electric element from the other electric elements. That is, Joule heating is easy to be large when the battery short-circuits. In other words, in the all-solid-state battery 100 including a plurality of the electric elements 20, 20, . . . connected in parallel as described above, the above described problems may arise. Any conventionally known member may be used as a member for electrically connecting the electric elements 20 to each other. For example, as described above, one can provide the tabs 21a for the cathode current collector layers 21, and the tabs 25a for the anode current collector layers 25, to electrically connect the electric elements 20 to each other in parallel via the tabs 21a and 25a.

1.3.3. Electric Connection of Short-Circuit Current Shunt Part and Electric Elements In the all-solid-state battery 100, the first current collector layers 11 of the short-circuit current shunt part 10 are electrically connected with the cathode current collector layers 21 of the electric elements 20, and the second current collector layer 12 of the short-circuit current shunt part 10 is electrically connected with the anode current collector layers 25 of the electric elements 20. Electric connection of the short-circuit current shunt part 10 and the electric elements 20 like this makes it possible to generate a large rounding current from the other electric elements (for example, the electric element 20b) to the short-circuit current shunt part 10, for example, when the short-circuit current shunt part 10 and some electric elements (for example, the electric element 20a) short-circuit. Any conventionally known member may be used as a member for electrically connecting the short-circuit current shunt part 10 and the electric elements 20. For example, as described above, one can provide the tabs 11a for the first current collector layers 11, and the tab 12a for the second current collector layer 12, to electrically connect the short-circuit current shunt part 10 and the electric elements 20 via the tabs 11a and 12a.

1.3.4. Positional Relationship Between Short-Circuit Current Shunt Part and Electric Elements The short-circuit current shunt part 10 and a plurality of the electric elements 20, 20, . . . have only to be stacked to each other. The short-circuit current shunt part 10 may be stacked outside a plurality of the electric elements 20, 20, . . . , between a plurality of the electric elements 20, 20, . . . , or both outside and between a plurality of the electric elements 20, 20, . . . . Especially, as shown in FIG. 1, when the short-circuit current shunt part 10 and a plurality of the electric elements 20, 20, . . . are stacked, the short-circuit current shunt part 10 is preferably provided at least outside a plurality of the electric elements 20, 20, . . . . Whereby in nail penetration testing, the short-circuit current shunt part 10 short-circuits before the electric elements 20, 20, . . . , which makes it possible to generate a rounding current from the electric elements 20 to the short-circuit current shunt part 10, to suppress heat generation inside the electric elements 20.

Short circuits of the battery due to nail penetration are easy to occur when a nail is penetrated from a cathode current collector layer 21 toward the anode current collector layer 25 (or from the anode current collector layer 25 toward a cathode current collector layer 21) of an electric element 20. That is, in the all-solid-state battery 100, a direction of nail penetration is preferably the same as that of stacking the layers. More specifically, in the all-solid-state battery 100, the following directions are preferably the same: the direction of stacking the cathode current collector layer 21, the cathode material layer 22, the solid electrolyte layer 23, the anode material layer 24, and the anode current collector layer 25 in each electric element 20; the direction of stacking a plurality of the electric elements 20; the direction of stacking the first current collector layers 11, the insulating layers 13, and the second current collector layer 12 in the short-circuit current shunt part 10; and a direction of stacking the short-circuit current shunt part 10 and a plurality of the electric elements 20, 20, . . . . The case of having such structure makes the effect more outstanding.

1.3.5. Relationship Between Short-Circuit Current Shunt Part and Electric Elements in Size In the all-solid-state battery 100, the short-circuit current shunt part 10 covers as much part of the electric elements 20 as possible, which makes it easy to short-circuit the short-circuit current shunt part 10 before the electric elements 20 in nail penetration. In view of this, for example, in the all-solid-state battery 100, the outer edge of the short circuit current shunt part 10 preferably exists outside the outer edges of the electric elements 20, 20, . . . when viewed in the direction of stacking the short circuit current shunt part 10 and a plurality of the electric elements 20, 20, . . . . Alternatively, when the direction of stacking a plurality of the electric elements 20, 20, . . . is the same as that of stacking the layers 21 to 25 in the electric elements 20, the outer edge of the short-circuit current shunt part 10 preferably exists outside the outer edges of the cathode material layers 22, the solid electrolyte layers 23, and the anode material layers 24 when viewed in the direction of stacking the short-circuit current shunt part 10 and a plurality of the electric elements 20, 20, . . . . In this case, the first current collector layers 11 of the short-circuit current shunt part 10 and the anode current collector layers 25 of the electric elements 20 may not short-circuit. That is, an insulator or the like is provided between the short-circuit current shunt part 10 and the electric elements 20, so as to prevent short circuits of the short-circuit current shunt part 10 and the electric elements 20 even if the short-circuit current shunt part 10 is enlarged.

On the other hand, from the viewpoints that the energy density of the battery is further improved, and short circuits of the short-circuit current shunt part 10 and the electric elements 20 can be easily prevented as described above, the short-circuit current shunt part 10 is preferably as small as possible. That is, in view of these, in the all-solid-state battery 100, the outer edge of the short circuit current shunt part 10 preferably exists inside the outer edges of the electric elements 20, 20, . . . when viewed in the direction of stacking the short circuit current shunt part 10 and a plurality of the electric elements 20, 20, . . . . Alternatively, when the direction of stacking a plurality of the electric elements 20, 20, . . . is the same as that of stacking the layers 21 to 25 of the electric elements 20, the outer edge of the short-circuit current shunt part 10 preferably exists inside the outer edges of the cathode material layers 22, the solid electrolyte layers 23, and the anode material layers 24 when viewed in the direction of stacking the short-circuit current shunt part 10 and a plurality of the electric elements 20, 20, . . . .

1.4. Operation and Effect of all-Solid-State Battery 100

Figure 2:
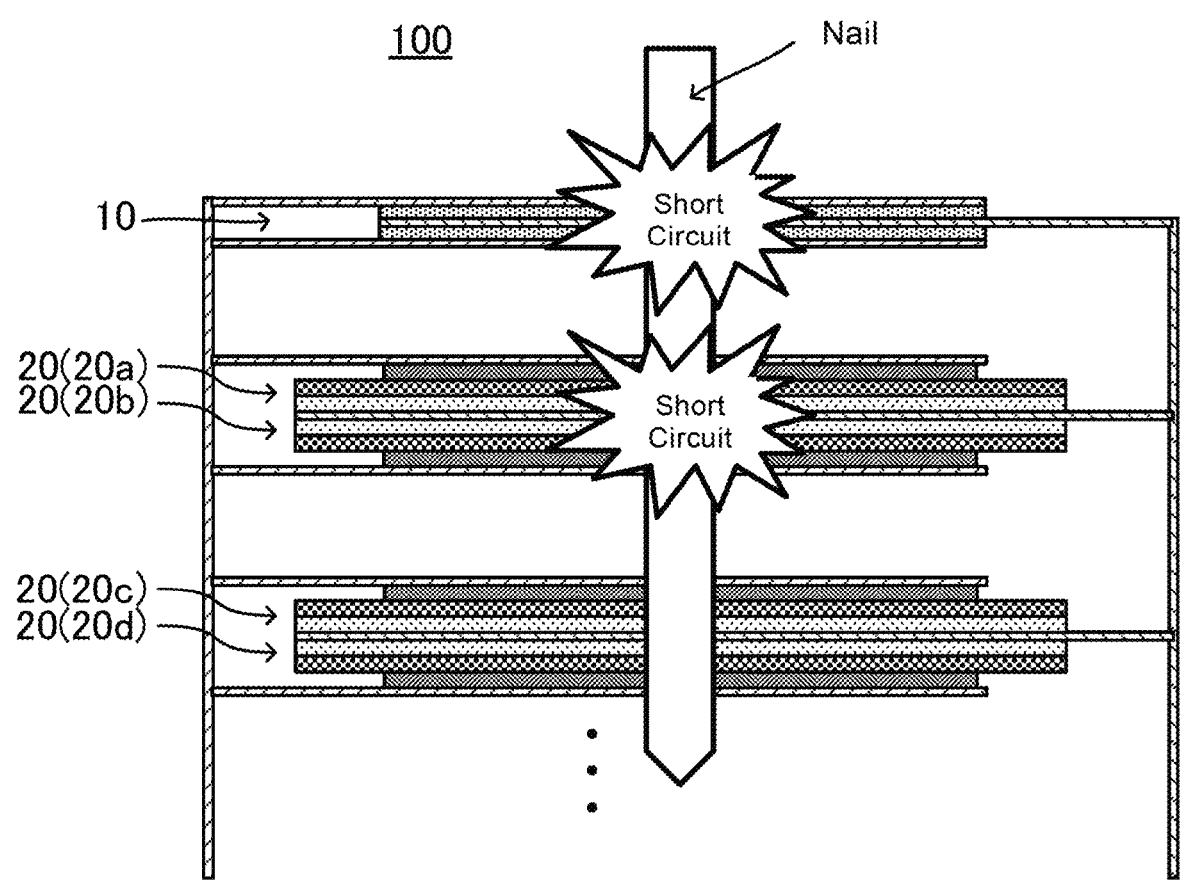
FIG. 2 is an explanatory schematic view of an example of a state of internal short circuits in the all-solid-state battery 100 in nail penetration testing.
Figure 3:
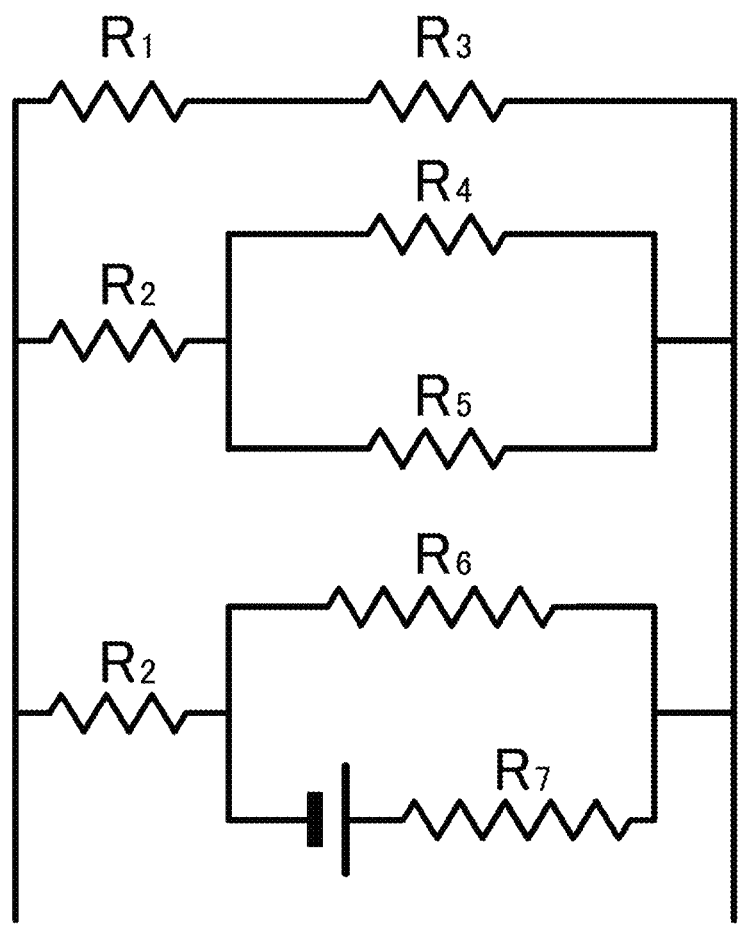
FIG. 3 is an explanatory schematic view of an example of an equivalent circuit of the all-solid-state battery 100 in nail penetration testing.

Operation and effect of the all-solid-state battery 100 will be described in more detail with reference to FIGS. 2 and 3. In FIGS. 2 and 3, when the all-solid-state battery 100 is subjected to nail penetration testing, the short-circuit current shunt part 10 and the electric elements 20a and 20b short-circuit, and the electric elements 20c and 20d do not short-circuit. In an equivalent circuit shown in FIG. 3, let resistance $R_1$ between the tabs 11a and 12a of the short-circuit current shunt part 10 and resistance $R_2$ between the tabs 21a and 25a of the electric elements 20, 20, . . . be equal ($R_1=R_2$), and in this case, while resistance $R_3$ of the short-circuit current shunt part 10, and resistance $R_4$ and $R_5$ of the electric elements 20a and 20b take smaller values due to short circuits, resistance $R_6$ and $R_7$ of the electric elements 20c and 20d, which do not short-circuit, keep their values large, and continue to supply power to the outside via the tabs. Here, in the all-solid-state battery 100, the contact resistance between the first current collector layers 11 and the second current collector layer 12 that configure the short-circuit current shunt part 10 when pressure at 100 MPa is applied is lower than that between the cathode current collector layer 21 and the anode current collector layer 25 of the electric element 20a when pressure at 100 MPa is applied. In addition, when the all-solid-state battery is subjected to nail penetration testing, pressure as high as 100 MPa is applied to the layers. Therefore, the relationship between the current collector layers each other in magnitude of the contact resistance when pressure at 100 MPa is applied is believed to correspond to that of the current collector layers each other in magnitude of the shunt resistance when the all-solid-state battery is subjected to nail penetration testing. That is, when the all-solid-state battery 100 is subjected to nail penetration testing, the shunt resistance $R_3$ of the short-circuit current shunt part 10 is believed to take a smaller value than the shunt resistance $R_4$ and $R_5$ of each of the electric elements 20a and 20b ($R_3<R_4$, $R_3<R_5$). Therefore, a larger rounding current from the electric elements 20c and 20d flows into the short-circuit current shunt part 10 than to the electric elements 20a and 20b. That is, the all-solid-state battery 100 makes it possible to suppress a current flowing into the electric elements 20 in nail penetrating testing, to suppress temperature rising in the electric elements 20.

As described above, the all-solid-state battery 100 can make the shunt resistance of the short-circuit current shunt part lower than that of an electric element when the short-circuit current shunt part and the electric element short-circuit in nail penetration testing, which makes it possible to pass a larger rounding current to the short-circuit current shunt part than to the electric elements.

2. Method for Producing all-Solid-State Battery

Figure 4:
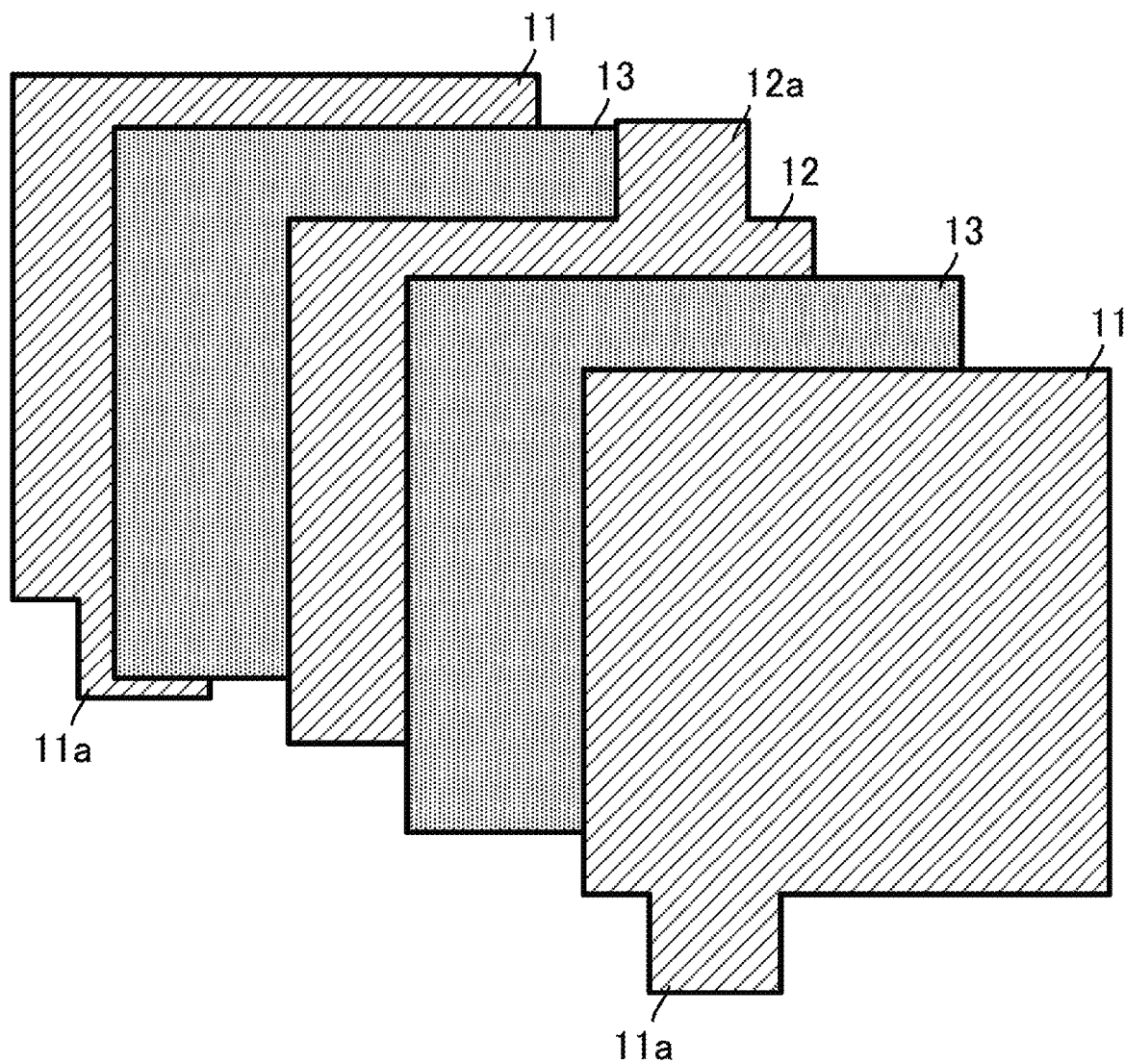
FIG. 4 is an explanatory schematic view of an example of component members of a short-circuit current shunt part 10.

The short-circuit current shunt part 10 can be easily made by arranging the insulating layers 13 (for example, insulating film) between the first current collector layers 11 (for example, metal foil) and the second current collector layer 12 (for example, metal foil). As shown in FIG. 4, one may arrange the insulating layers 13, 13 over both faces of the second current collector layer 12, and further arrange the first current collector layers 11, 11 over the surfaces of the insulating layers 13, 13 which are on the opposite sides of the second current collector layer 12. Here, the layers may be stuck to each other using an adhesive, resin, etc. in order to keep the shape of the short-circuit current shunt part 10. In this case, an adhesive etc. are not necessary to be applied all over the layers, but have only to be applied to part of a surface of each layer.

Each electric element 20 can be made by any known method. For example, one may form the cathode material layer 22 by coating the surface of the cathode current collector layer 21 with cathode material in a wet process, to dry the resultant, form the anode material layer 24 by coating the surface of the anode current collector layer 25 with anode material in a wet process, to dry the resultant, transfer the solid electrolyte layer 23 containing a solid electrolyte etc. between the cathode material layer 21 and the anode material layer 24, and integrally press-form the layers, to make the electric element 20. Pressing pressure at this time is not limited, but for example, is preferably no less than 2 ton/cm². These making procedures are just an example, and the electric element 20 can be made by procedures other than them as well. For example, the cathode material layer etc. can be formed by a dry process instead of a wet process.

The short-circuit current shunt part 10 made as described above is stacked onto a plurality of the electric elements 20. In addition, the tabs 11a provided for the first current collector layers 11 are connected with the tabs of the cathode current collector layers 21, the tab 12a provided for the second current collector layer 12 is connected with the anode current collector layers 25, the tabs of the cathode current collector layers 21 are connected with each other, and the tabs of the anode current collector layers 25 are connected with each other, which makes it possible to electrically connect the short-circuit current shunt part 10 with the electric elements 20, and to electrically connect a plurality of the electric elements 20 with each other in parallel. This stack formed via electric connection as described above is vacuum-sealed in a battery case of laminate film, a stainless steel can or the like, which makes it possible to make the all-solid-state battery 100. These making procedures are just an example, and the all-solid-state battery 100 can be made by procedures other than them as well.

3. Additional Notes

The above description showed the embodiment of configuring a short-circuit current shunt part by two first current collector layers, two insulating layers, and one second current collector layer. The all-solid-state battery of the present disclosure is not restricted to this embodiment. The short-circuit current shunt part has only to include the insulating layer between the first and second current collector layers, and the numbers of the layers are not limited.

The above description showed the embodiment that two electric elements share one anode current collector layer. The all-solid-state battery of the present disclosure is not restricted to this embodiment. Each electric element has only to function as a single cell, where the cathode current collector layer, the cathode material layer, the solid electrolyte layer, the anode material layer, and the anode current collector layer are stacked.

The above description showed the embodiment of providing only one short-circuit current shunt part in the all-solid-state battery. The number of the short-circuit current shunt parts is not limited to this. Two or more short-circuit current shunt parts may be provided in the all-solid-state battery.

The above description showed the embodiment that all the directions of stacking the layers are the same as the most preferable embodiment. However, the all-solid-state battery of the present disclosure is not restricted to this embodiment. At least one of the directions of stacking the cathode current collector layer and so on in each electric element, stacking a plurality of the electric elements, stacking the first current collector layers and so on in the short-circuit current shunt part, and stacking the short-circuit current shunt part and the electric elements may be different from the other.

The above description showed the embodiment of stacking a plurality of the electric elements. Some effect is believed to be brought about even in an embodiment that a plurality of the electric elements are not stacked in the all-solid-state battery (embodiment of being formed of only a single cell). However, the above described Joule heating is easier to increase in the embodiment of stacking a plurality of the electric elements than in the embodiment of stacking one electric element. That is, the effect is more outstanding in the embodiment of stacking a plurality of the electric elements, and this point is an advantage of stacking a plurality of the electric elements in the all-solid-state battery.

The above description showed a stacked "all-solid-state battery". An all-solid-state battery has little space in the electrodes, and is formed of hard material. Thus, pressure as high as 100 MPa is applied to the layers in nail penetration testing. Therefore, the contact resistance between the first and second current collector layers which configure the short-circuit current shunt part when pressure at 100 Mpa is applied is set to take a smaller value than that between the cathode and anode current collector layers which configure an electric element when pressure at 100 Mpa is applied so that the shunt resistance under such high pressure takes a proper value. On the other hand, a battery case of a solution based battery is generally filled with an electrolyte solution, the layers are immersed with the electrolyte solution, and this solution based battery is not formed of hard material like an all-solid-state battery. Thus, in a solution based battery, pressure as high as 100 MPa is not applied to the layers in nail penetration testing. According to findings of the inventors of the present application, the contact resistance between current collector layers each other changes depending on pressure to be applied. That is, combination of current collector layers, the contact resistance between which takes a small value under low pressure is not always combination that makes the contact resistance under high pressure take a small value as well. As described above, the technique of this disclosure can be said to bring about outstanding effect for the first time when applied to an all-solid-state battery.

As disclosed in Patent Literature 1, when the electric elements are electrically connected with each other in series using a bipolar electrode, it is believed that if a nail is penetrated through some electric elements, a rounding current flows via the nail from the other electric elements to some electric elements. That is, the rounding current flows via the nail, which has high contact resistance, and thus the current flow thereof is small. When the electric elements are electrically connected with each other in series via a bipolar electrode, the rounding current is believed to be the largest when a nail is penetrated through all the electric elements. In this case, it is believed that discharge of the electric elements has sufficiently progressed already, and thus, it is difficult to occur that the temperature of some electric elements locally rises. On the other hand, when the electric elements are electrically connected to each other in parallel, short circuits of only some electric elements in nail penetration testing lead to concentration of a rounding current in some electric elements via the tabs etc., which easily raise the problem that the temperature of some electric elements locally rises. As described above, the technique of this disclosure solves the problems unique to a battery where electric elements are electrically connected with each other in parallel, and exerts the effect especially outstandingly on a battery where electric elements are electrically connected with each other in parallel.

EXAMPLES

Various metal foils were prepared. Changes in contact resistance between the metal foils each other were evaluated when pressure of pressing the metal foils to each other was varied.

1. Metal Foils

The metal foils used for the evaluation were as follows:
aluminum foil (15 μm in thickness, 1N30 manufactured by UACJ Corporation)
copper foil (12 μm in thickness, electrodeposited copper foil manufactured by Furukawa Electric Co., Ltd.)
stainless steel (SUS) foil (15 μm in thickness, SUS304)
carbon coating copper foil A (see below)
carbon coating aluminum foil (see below)
carbon coating copper foil B (16 μm in thickness, CDX manufactured by Showa Denko K.K.)

The carbon coating copper foil A and the carbon coating aluminum foil were made as follows: that is, furnace black (66 nm in mean primary particle size, manufactured by Tokai Carbon Co., Ltd.) as a conductive material, alumina (CB-P02 manufactured by Showa Denko K.K.) as another filler and PVDF (KF Polymer L #9130 manufactured by Kureha Corporation) as polymer were mixed with NMP so as to have the volume ratio of 10:60:30, to make a paste. The above described copper foil and aluminum foil were coated with this paste, to be dried in a heating furnace, to form a carbon coating layer on the surface of each of the copper foil and aluminum foil. The thickness of the dried carbon coating layer was 10 μm.

2. Combinations of Metal Foils

The contact resistance between foils of the combinations 1 to 5 shown in the following Table 1 under predetermined pressure was measured.

3. Method for Measuring Contact Resistance

Figure 5:
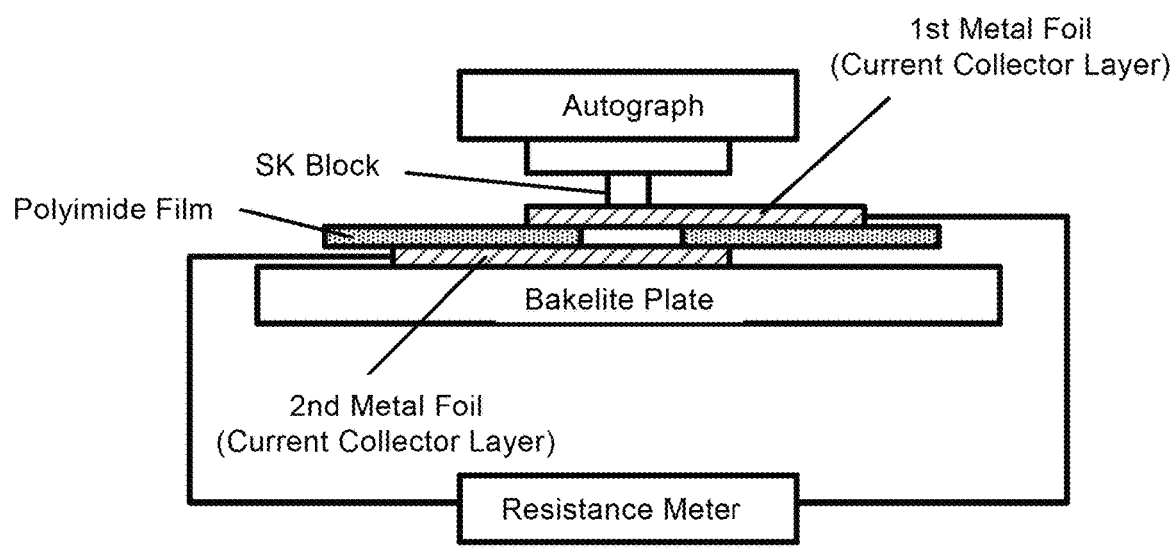
FIG. 5 is an explanatory schematic view of structure of equipment for measuring the contact resistance between metal foils.
Figure 6:
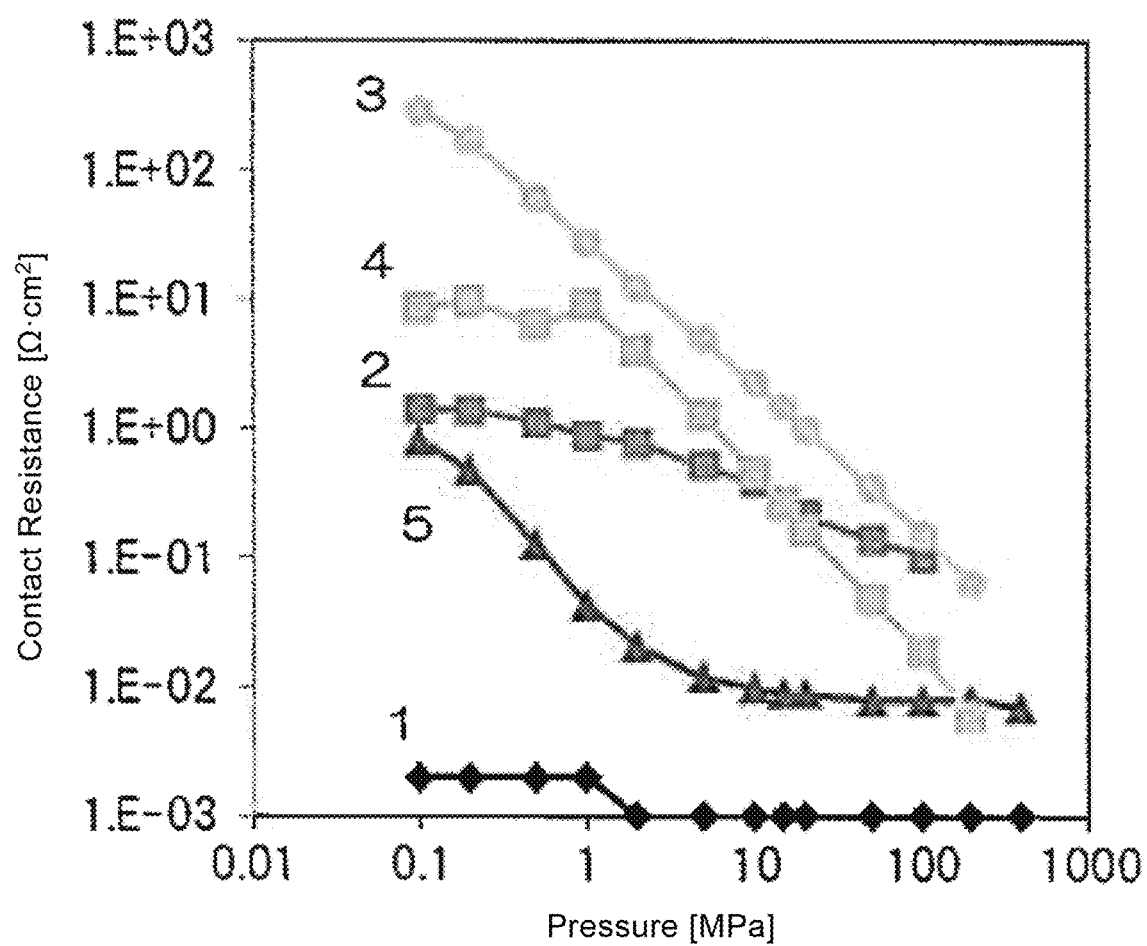
FIG. 6 shows relationship between pressure and contact resistance of combinations of various metal foils.

Using equipment shown in FIG. 5, the contact resistance between the metal foils each other was measured while the metal foils were pressed to each other by the predetermined pressure. Specifically, two metal foils were held by a block of a SK material of 11.28 mm in diameter, and a Bakelite plate (a polyimide film was placed between the metal foils partially); and the contact resistance when the predetermined pressure was applied by an Autograph was measured by a resistance meter (RM3542 manufactured by HIOKI E.E. CORPORATION). The contact resistance when pressure at 100 MPa was applied is shown in the following Table 1. FIG. 6 shows the relationship between pressure and contact resistance of the combinations 1 to 5 shown in Table 1.

TABLE 1

|   | 1st Current Collector Layer | 2nd Current Collector Layer | Contact Resistance when Pressure at 100 MPa is Applied [Ω · cm$^2$] |
|---|---|---|---|
| 1 | Al Foil | Cu Foil | 0.001 |
| 2 | SUS Foil | Cu Foil | 0.103 |
| 3 | Al Foil | Carbon Caoting Cu Foil A | 0.156 |
| 4 | Carbon Coating Al Foil | Cu Foil | 0.019 |
| 5 | Al Foil | Carbon Coating Cu Foil B | 0.117 |

As apparent from the results shown in Table 1 and FIG. 6, contact resistance between metal foils (current collector layers) largely vary according to combination of metal foils. It is also seen from the results shown in FIG. 6 that combination of metal foils, the contact resistance between which takes a small value under low pressure is not always combination that makes the contact resistance take a small value under high pressure as well. The reason therefor is, for example, believed that softness (malleability) varies according to metal foils, and adhesion of metal foils to each other varies according to their softness (malleability), which affects the change in contact resistance from low pressure to high pressure. It is also believed that a contact state of conductive materials each other in the constituent materials of carbon coating foil as an example changes following pressurization, which leads to the change in contact resistance from low pressure to high pressure. Even if a kind of an insulating film held between metal foils is changed, the tendency of the contact resistance varying according to pressure is not changed.

The inventors of the present application also measured the resistance when 100 MPa was applied in the same way as the above in cases where an anode mixture containing anode active material was held between the metal foils, and where a cathode mixture containing cathode active material was held therebetween. As a result, the resistance in the cases where the anode mixture was held between the metal foils, and where the cathode mixture was held therebetween (resistance between the metal foils via the anode material or cathode material) took a larger value than that in a case where they were not held between the metal foils. From the above, it is believed that when an all-solid-state battery is actually subjected to nail penetration testing, there is a possibility that the existence of an electrode mixture makes the shunt resistance of the electric elements high. In other wards, it can be said that the shunt resistance of the electric elements is lowest in nail penetration testing when the current collector layers of the electric elements touch to each other (as far as the inventors of the present application confirmed, when an all-solid-state battery formed of a plurality of stacked electric elements was subjected to nail penetration testing, a value of the shunt resistance of each electric element had the same as, or a larger order than the contact resistance between cathode and anode current collector layers of the electric element). Thus, it is believed that when the contact resistance between the current collector layers each other of the short-circuit current shunt part is lower than that between the current collector layers each other of each electric element, a large rounding current can surely flow into the short-circuit current shunt part when the layers short-circuit in nail penetration testing.

INDUSTRIAL APPLICABILITY

For example, the all-solid-state battery according to this disclosure can be preferably used as an in-vehicle large-sized power source.

REFERENCE SIGNS LIST 10 short-circuit current shunt part
11 first current collector layer
12 second current collector layer
13 insulating layer
20 electric elements
21 cathode current collector layer
22 cathode material layer
23 solid electrolyte layer
24 anode material layer
25 anode current collector layer
100 all-solid-state battery

What is claimed is:

1. An all-solid-state battery comprising at least one short-circuit current shunt part and a plurality of electric elements, the short-circuit current shunt part and the electric elements being stacked, wherein the short-circuit current shunt part comprises a first current collector layer, a second current collector layer, and an insulating layer provided between the first and second current collector layers, all of the layers being stacked, each of the electric elements comprises a cathode current collector layer, a cathode material layer, a solid electrolyte layer, an anode material layer, and an anode current collector layer, all of the layers being stacked, the electric elements are electrically connected to each other in parallel, the first current collector layer is electrically connected with the cathode current collector layer, the second current collector layer is electrically connected with the anode current collector layer, the insulating layer is a thermosetting resin, the first and second current collector layer materials are a pair that is different from that of the cathode and anode current collector layer materials, and contact resistance between the first and second current collector layers when pressure at 100 MPa is applied is lower than that between the cathode and anode current collector layers when pressure at 100 MPa is applied.

2. The all-solid-state battery according to claim 1, wherein the first current collector layer is formed of aluminum,
the second current collector layer is formed of copper,
the cathode current collector layer is formed of stainless steel, and
the anode current collector layer is formed of copper.

3. The all-solid-state battery according to claim 1, wherein the directions as follows are the same:
a direction of stacking the cathode current collector layer, the cathode material layer, the solid electrolyte layer, the anode material layer, and the anode current collector layer in each of the electric elements;
a direction of stacking the electric elements;
a direction of stacking the first current collector layer, the insulating layer, and the second current collector layer in the short-circuit current shunt part; and
a direction of stacking the short-circuit current shunt part and the electric elements.

4. The all-solid-state battery according to claim 1, wherein the short-circuit current shunt part is provided at least outside the electric elements.

* * * * *